358-218. XR 3,710,018 SR

United States Patent [19]

Ryley et al.

[11] 3,710,018

[45] Jan. 9, 1973

[54] TELEVISION CAMERA AUTOMATIC BEAM ALIGNMENT

[75] Inventors: Derek Vernon Ryley, Ingatestone, Essex; Gyongyver Claydon, Chelmsford, Essex, both of England

[73] Assignee: The Marconi Company Limited, London, England

[22] Filed: July 17, 1970

[21] Appl. No.: 55,656

[30] Foreign Application Priority Data

Aug. 11, 1969 Great Britain....................40,075/69

[52] U.S. Cl.............................178/7.2, 178/DIG. 29
[51] Int. Cl............................................H04n 3/16
[58] Field of Search....178/6.8, 7.2, DIG. 29; 315/10, 315/31 N, 18

[56] References Cited

UNITED STATES PATENTS 2,806,978 9/1957 Hurford et al................178/DIG. 29

FOREIGN PATENTS OR APPLICATIONS 803,122 10/1958 Great Britain................178/DIG. 29

*Primary Examiner*—Robert L. Griffin
*Assistant Examiner*—George G. Stellar
*Attorney*—Baldwin, Wight and Brown

[57] ABSTRACT

A television camera which includes a cathode ray tube has an arrangement for aligning the beam and providing beam focusing in which the focusing field is modulated while the tube scans a test card. The test card has a predetermined pattern of light and shade which causes a change in camera tube output. This output is used to automatically adjust the beam alignment in relation to the modulating of the focusing field.

3 Claims, 4 Drawing Figures

T5141
X5142
X5054

TELEVISION CAMERA AUTOMATIC BEAM ALIGNMENT

This invention relates to television cameras, and more specifically to television cameras of the kind employing a cathode ray camera tube having a target electrode structure on which is developed an electrical image of a subject of transmission and which is scanned by a cathode ray beam to develop picture signals. Well known examples of such tubes are the image orthicon and the vidicon. The scanning ray beam in such tubes must be correctly axially aligned in the tube (in the absence of applied scanning deflection forces) and this is usually achieved by means of mutually perpendicular magnetic fields produced by coils mounted round the electron gun of the tube. Adjustment to achieve such alignment in individual tubes is almost always necessary. An established method of determining the magnetic field adjustment necessary in any individual tube to obtain alignment is by noting the misalignment effects produced by altering the beam focusing field and then adjusting the alignment coil currents until these effects are minimized. For further information about this method reference may be made to the specification of our previous U.K. Pat. No. 803,122. In practice, when using this method, the beam focusing field is modulated by a rectangular wave of a frequency which is an integral fraction of the television field frequency. If the alignment is not correct, variations in the focusing field due to the rectangular wave modulation will cause the center of a picture reconstituted (in a monitor tube) from signals from the camera tube to shift in position and, the modulating wave frequency being an integral fraction of the television field frequency, the monitor screen will display (if the beam in the camera tube is not correctly aligned) two pictures which are slightly displaced with respect to one another. Manual adjustment means for the alignment coils are provided and are adjusted until, with the rectangular modulating wave still applied, there is minimum central shift and the two pictures merge as nearly as possible into one. As will be readily appreciated adjustment in this way to achieve beam alignment requires considerable skill and takes time. The present invention seeks to overcome these disadvantages and to provide means whereby, when required, alignment adjustment of the beam can be effected automatically.

According to this invention a television camera including a camera cathode ray tube having beam alignment means operative to vary the beam alignment in at least the television field direction and providing beam focusing and beam aligning fields comprises main modulating means operable at will, for modulating the focusing field at a frequency which is a predetermined fraction of the television field frequency, while the tube is scanning a predetermined pattern of light and shade having a predetermined change in light and shade at a predetermined position therein; means for determining the time during television field deflection at which a change in camera tube output corresponding with said predetermined change in light and shade occurs; and means actuated in dependence upon said time of occurrence for automatically adjusting said beam aligning field means to adjust the beam alignment in the television field direction so as to cause said occurrence to take place at a predetermined time in relation to the focusing field modulating waveform. Preferably said predetermined time of occurrence is in the middle of a television field deflection.

Preferably the beam aligning field means are operative to vary the beam alignment in both the television field direction and the television line direction and there are also provided:— means, operable in alternation with the aforesaid means for determining the time during television field deflection at which a change in camera tube output corresponding with said predetermined change in light and shade occurs, for determining the time during the television line deflection at which a change in camera tube output corresponding with the aforesaid predetermined change in light and shade occurs; and means actuated in dependence upon this time of occurrence for automatically adjusting the beam aligning field means to adjust the beam alignment in the television line direction so as to cause said occurrence to take place at a predetermined time in relation to the focusing field modulating waveform. Preferably this predetermined time of occurrence is mid-way along a television line.

Preferably the time of occurrence, during the television field deflection, at which a change in camera tube output occurs, is determined by a reversible counter arranged to make, during two successive television fields, oppositely directed counts of the number of television lines preceding (or following) in one television field said time of occurrence and to produce a control signal, dependent on the polarity of the count difference, which is utilized to adjust beam alignment in the television field direction. In the case of an interlaced television system the two successive fields will be alternate television fields but in a non-interlaced system the said two fields will be immediately successive fields.

Preferably also the time of occurrence, during the television line deflection, at which a change in camera tube output occurs, is determined by a reversible counter arranged to make in two successive television fields, oppositely directed counts of the number of cycles of a locally generated oscillation of higher frequency than the line frequency and which occur preceding (or following) in one television line, said time of occurrence and to produce a control signal, dependent on the polarity of the count difference, which is utilized to adjust beam alignment in the television line direction. As before the two successive television fields will be alternate in the case of an interlaced television system or immediately successive television fields in the case of a non-interlaced system.

Preferably a single counter is employed in alternation both for counting television lines for production of a control signal for adjusting beam alignment in the television field direction and for counting cycles of the locally generated oscillation for production of a control signal for adjusting beam alignment in the television line direction, said employment in alternation being effected under the control of a change-over control device actuated at a predetermined sub-multiple of the television field frequency and operative to reset the counter at each change over. A preferred embodiment of this nature also comprises a gate control device which is set to the start condition by television field pulses and to the stop condition by a predetermined output level change in the camera tube output and which controls (when said changeover device is in one condition) the opening and closing of a gate through which (when open) television line frequency pulses are fed to said counter; a generator control device which is set to the start condition by television line pulses and to the stop condition by said predetermined output level change and which controls (when said change-over device is in its other condition) the supply of locally generated oscillations to said counter; means for storing the polarity of the successive count differences (of television line frequency pulses and of locally generated oscillations) produced in alternation by said counter and for utilizing the same for beam alignment adjustment in the television field and television line directions.

Preferably the frequency of modulation by the main modulating means is one quarter of the television field frequency.

Preferably again the modulating waveform of the main modulating means is rectangular.

Preferably beam alignment adjustment is effected by means including controlled motor driven potentiometers controlling current in windings for beam alignment.

The preferred pattern of light and shade which is scanned by the camera tube when the automatic beam alignment adjustment means provided by this invention are put into operation is what may be termed a "test chart" having a small white square area at the center of an otherwise black card.

The invention is illustrated in and further explained with reference to the accompanying drawings in which.

Figures 1, 2, 4:
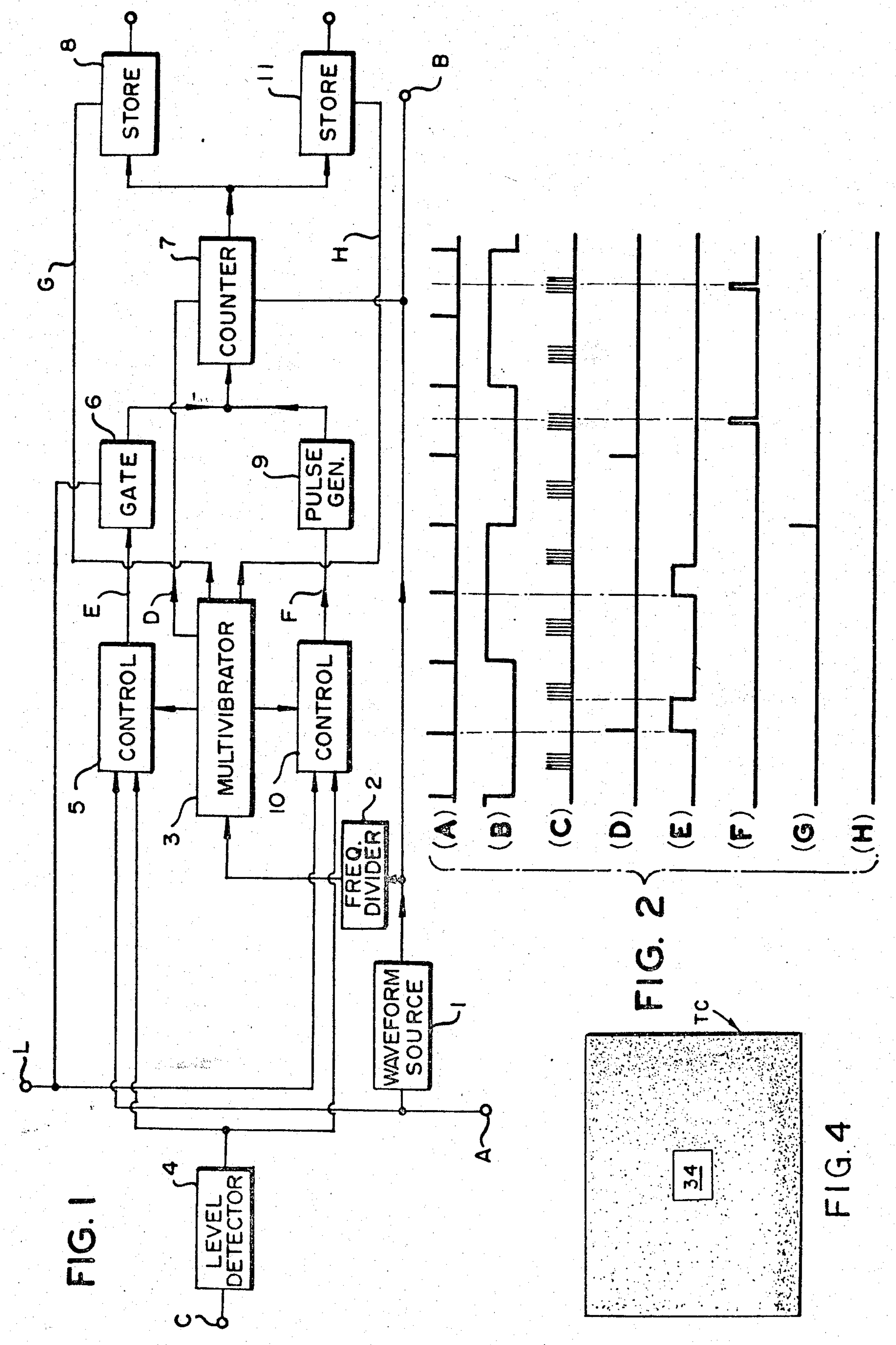
FIG. 1 illustrates, so far as is necessary to an understanding of the present invention, a television camera in accordance therewith.
FIG. 2 is a set of explanatory "idealized" graphical figures relating to the operation of FIG. 1.
FIG. 4 is a view showing a typical test card.
Figure 3:
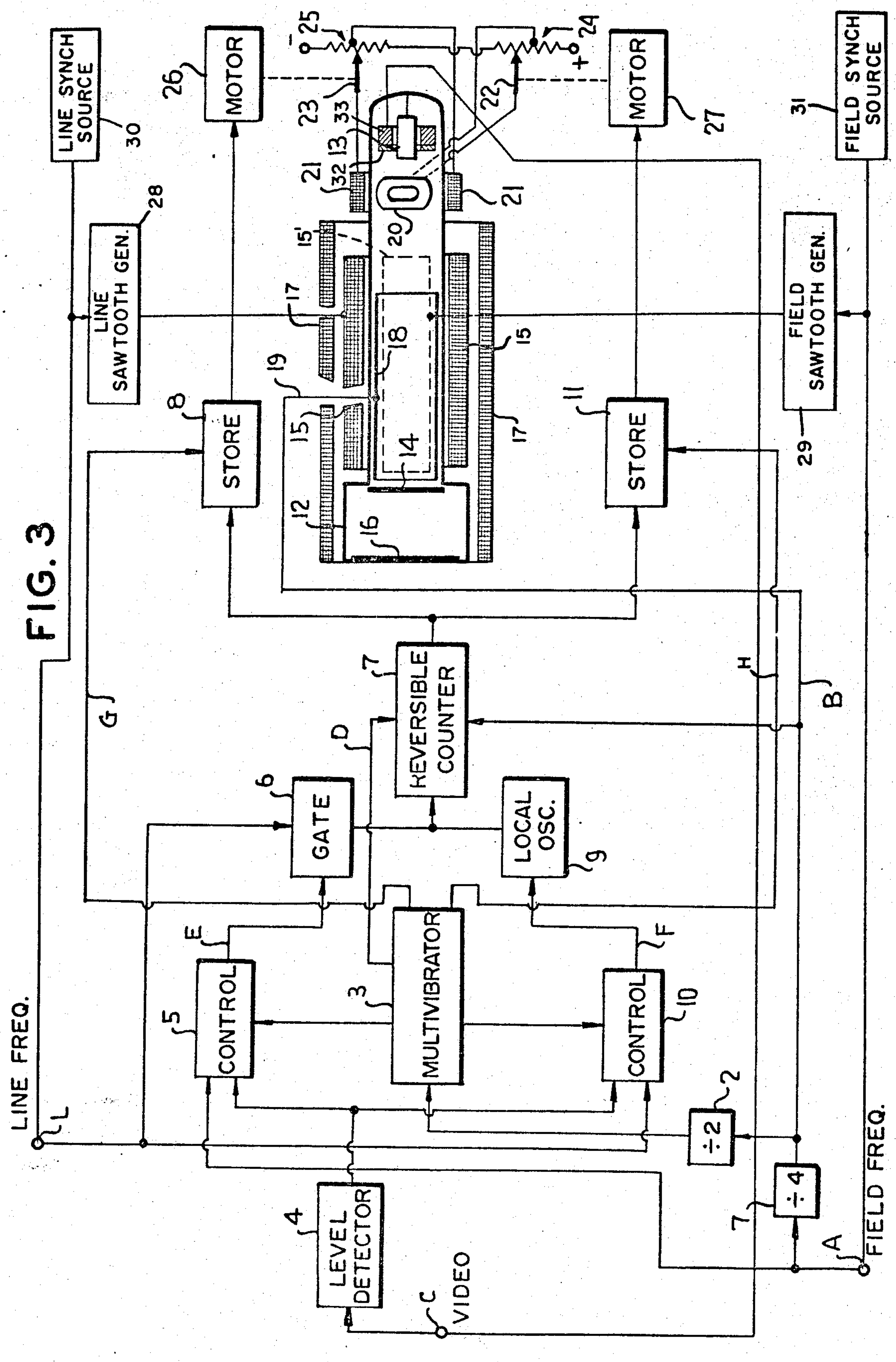
FIG. 3 is a diagram illustrating the arrangement of the invention in relation to a conventional television camera tube.

The said FIG. 1 is a block diagram showing the control circuitry in accordance with this invention which is brought into use by suitable switching (not shown) when it is desired to achieve automatic alignment adjustment in accordance with this invention. Other parts of the camera are not shown in FIG. 1 — the camera tube itself with its focusing, beam aligning, and deflecting coils are omitted from the figure but are shown in FIG. 3 as are the scanning deflection wave sources, amplifiers, camera control unit and other parts and assemblies required for the camera to be operative in the normal way to televise scenes, may take any suitable forms known per se. The control circuitry shown in FIG. 1 is suitable for use in the usual case of a television camera operating with interlaced scanning and in describing FIG. 1 it will be assumed that, when the illustrated circuitry is brought into use, the camera is arranged to scan a test chart as above described (see FIG. 4).

Referring to the drawings, pulses at the television field frequency and as shown by line A of FIG. 2 are applied from the source 31 (FIG. 3) at the terminal A of FIG. 1 and video output signals as exemplified by line C of FIG. 2 are applied from the camera tube at terminal C of FIG. 1. Pulses like those of line A of FIG. 2 but at the television line frequency are applied at terminal L of FIG. 1 from the source 30 (FIG. 3). The video signals of line C of FIG. 2 are obtained when the camera tube is scanning a test chart TC which has a small white central square 34 but is otherwise black as shown in FIG. 4. When the automatic alignment adjusting circuitry of FIG. 1 is brought into use the camera tube is, as already explained, focused on this card to "-televise" it.

The television field frequency pulses at terminal A are translated into a rectangular wave-form of one quarter the television field frequency and as shown by line B of FIG. 2 by a waveform source 1 of any convenient known form — e.g., a multivibrator — driven by the pulses of line A. This waveform is fed out at terminal B of FIG. 1 and applied to the normally provided focusing coil 17 of the camera tube so that a focusing field modulated in accordance with waveform B is obtained.

The output from the waveform source 1 is again divided in frequency by a factor of two by a frequency dividing rectangular waveform source 2 and this waveform is used to control the operation of a change-over device 3 of any convenient known form and the purpose of which is to obtain alternately, over successive half-waves of the output from source 2, the automatic beam alignment in the television field direction and in the television line direction. The device 3 could incorporate a multivibrator, for example. Assume for the moment that the device 3 is in the condition for ensuring automatic beam alignment in the television field direction.

The video input at C is fed to a level detector 4 the output of which changes sharply when the camera tube "encounters" the small central white square 34 in the test chart. When this change occurs a gate control device 5, such as a bistable, which was previously in a condition (herein called the "start" condition) such as to permit a gate 6 to assume the "open" condition, assumes a condition (herein termed the "stop" condition) which is such that the gate 6 must be closed. The gate control device 5 was previously set to the start condition by the last preceding television field pulse at A. The said gate control device 5 has an over-riding control by the change-over device 3 such that it is only when the said device 3 is in the condition above assumed that the gate control device 5 can operate to open the gate 6. When the gate 6 is open, television line pulses at terminal L are fed to a reversible counter 7, the direction of count of which is controlled by the waveform output from the waveform source 1.

The reversible counter 7 is reset to zero by resetting pulses delivered over line D by the device 3 and timed as shown by line D of FIG. 2.

Line E of FIG. 2 shows the controlling pulses fed over lead E to the gate 6.

As will now be seen from FIGS. 1 and 2 as so far described, the focusing field of the camera tube is modulated at one quarter of the television field frequency and in accordance with the waveform B; at the start of a television field period (assuming the device 3 is in the condition assumed) the counter 7 is set at zero and simultaneously the gate 6 is opened by waveform E; and line pulses from L are fed to the counter 7, which operates in one direction to make a count of these pulses. When the small white central square in the test chart is "encountered" by the camera tube the gate 6 is closed by the leading edge of the video signal in line C setting the device 5 into the stop condition and when the next television field pulse arrives at terminal A it sets the gate control device 5 once more into the start condition and the gate 6 reopens. The counter 7 again counts television line pulses fed through gate 6 but this time the count is in the opposite direction because the direction of count has been changed by the change of polarity of the output from source 1. (as will be appreciated, line B of FIG. 2 represents not only the focusing field modulation but also the control of the direction of count.) After completion of the second count there will be in the counter a residual or difference count and this will be representative of the direction of alignment adjustment necessary in the television field direction. The polarity of the count difference is stored in a suitable storage device 8, the output from which is used as a control signal for producing beam alignment correction of the required sense and in the television field direction. At the end of each double count (one in one direction and the other in the other) by the counter 7, the polarity of the count difference is stored when pulse G (FIG. 2) is fed over lead G to store 8 and the counter is reset to zero by pulse D (FIG. 2) fed over lead D from the device 3.

Beam alignment in the television line direction is obtained when the change-over device 3 is switched to its other condition. The manner in which automatic alignment adjustment in the television line direction is achieved is generally similar to that above described for automatic alignment in the television field direction, the essential difference being that, for alignment in the television line direction, the reversible counter 7 counts relatively high frequency pulses delivered by a free-running generator 9 operating, for example, at 5 Mc/s. The supply of oscillations from this generator 9 to the counter 7 is controlled by a generator control device 10 which is set into the start condition by a line pulse from L and into the stop condition by the change of level occurring in the output from detector 4 when the camera tube "encounters," during a television line, the small white square at the middle of the test chart. As will now be understood, when the change-over device 3 is in the condition for alignment in the television line direction, the counter 7 counts, from the beginning of a line until the change of level occurs in the output from detector 4, cycles of oscillation from the generator 9. When the change of level occurs the count stops and is held temporarily in the counter. When under the control of the wave-form B of FIG. 2, the counting direction is reversed — this will occur two fields later — the counter again counts, but this time in the opposite direction, cycles of oscillation from generator 9 occurring from the beginning of a line until the aforesaid change of level again occurs. The polarity of the difference of these two successive opposite counts is stored in a storage device 11 when pulse H (FIG. 2) is fed over lead H from the change-over device 3. Line F of FIG. 2 appears on lead F of FIG. 1 and shows the output from the generator control device 10. The signals from the stores 8 and 11 are used to control the currents in the mutually perpendicular beam alignment coils and may be so used in any of a variety of different ways.

The illustrated arrangement of FIG. 1, though obviously not by any means the only way of carrying out the invention, has the advantage that one and the same reversible counter 7 is used for securing beam alignment in the television field direction and also in the television line direction, its use for these two different purposes being obtained in alternation. The output signals from sources 8 and 11 are, as above stated, employed (by means not shown) to control the currents in the beam alignment coils so as to secure automatic alignment. The control signals from 8 and 11 are in fact alignment error signals and, as will now be obvious, the condition of correct alignment is that obtained when these error signals are zero. As stated, the actual means by which the alignment coil currents are adjusted may take any of a variety of different forms but it is preferred to use for this purpose electric motor driven current controlling potentiometers in the coil current supply circuits, the driving motors being driven in directions determined by the sense of the error signal outputs from the sources 8 and 11. One advantage of using motor driven potentiometers in this way is that alignment corrected current settings are permanently "stored" (by the last positions adopted by the motors) even when the whole installation is switched off. However, other correction means may be employed, e.g., means utilizing digital or capacitive storage devices as known per se.

FIG. 3 illustrates the previously described circuitry of FIG. 1 in association with a conventional television camera tube of the type disclosed in United Kingdom Pat. No. 803,122 mentioned hereinbefore. The tube includes an envelope 12 containing an electron gun 13, the ray from which is caused to scan a target electrode 14 by means of suitable line scanning current waveforms from the generator 28 applied to the coil pair 15,15 and by means of suitable field scanning current waveforms from the generator 29 applied to the coil pair 15', 15', only one of which appears in dashed line outline for the purpose of clarity. These generators are driven by the usual line and field synchronization sources 30 and 31 whose respective outputs also provide the inputs at L and A. A photo-cathode 16 is on the end wall of the tube. A magnetic focusing coil 17 surrounds the envelope and a focusing electrode, in the form of a cylindrical wall electrode 18 is provided on the cylindrical wall of the envelope. An external connection 19 enables potential to be applied to the wall electrode 18 and, as shown, is connected to the output at B in FIGS. 1 and 2. Ray alignment adjustment is provided by an alignment coil system which is shown as constituted by two mutually perpendicular pairs of fixed coils 20 and 21 (one of the coils 20 does not appear in FIG. 3, being hidden behind the tube) the currents through which can be adjusted individually by adjusting the movable taps 22 and 23 of the potentiometers 24 and 25. As mentioned above, these adjustments may be under the control of motors 26 and 27 respectively connected to the outputs of the stores 8 and 11. As is well known, the electron beams from the gun 13 is reflected by the target electrode 14 to an annular collector electrode 32 and the electron multiplier 33 associated with this electrode provides an amplified video signal which is applied to point C as shown.

We claim:

1. In a television camera of the type having a cathode ray tube including target means for electrical representation of a video image, means for directing a cathode ray beam to said target means, means for producing an electrical representation of a fixed video test image at said target means and including a test card having a predetermined pattern of light and shade which presents an abrupt change in light and shade in the television field direction, beam alignment means for aligning the cathode ray beam of said tube at least in the television field direction, beam focusing means for providing variable beam focusing, means for deflecting said cathode ray beam to scan said target means at predetermined line and field frequencies, and means for producing video output signals representative of said fixed video test image during successive scanning deflections of said cathode ray beam, the combination of:

detecting means connected to said means for producing video output signals for producing during different field periods of scanning an output signal when said cathode ray beam first encounters that portion of said electrical representation of the video test image corresponding to said abrupt change in light and shade therein;

means for modulating said beam focusing means to vary the beam focusing thereof so that the number of television lines scanned before said detector means produces an output signal may vary in the event of beam misalignment in the field direction;

reversible counter means connected to said means for deflecting for counting in opposite directions during a pair of said different field periods and having an output in response to any difference in such counts;

control means connected to the output signal of said detecting means for causing said reversible counter means to count the number of television lines scanned before the detector means produces an output signal during said pair of different field periods; and means connected to the output of said reversible counter means for automatically adjusting said beam alignment means to align said beam in the field direction whereby the number of television lines scanned before said detecting means produces an output signal is the same during subsequent different field periods.

2. In combination with a television camera of the type having a cathode ray tube including target means for electrical representation of a video image; means for directing a cathode ray beam to said target means; means for producing an electrical representation of a fixed video test image to said target means in which the fixed video test image is a predetermined pattern of light and shade having boundary lines extending in the field and line directions; first beam alignment means for aligning the cathode ray beam in the television field direction; second beam alignment means for aligning the cathode ray beam in the television line direction; means for deflecting said cathode ray beam to scan said target means; beam focusing means for providing variable beam focusing; first pulse output means for producing an output at line frequency and connected to said means for deflecting to control scanning of the target means in the line direction at said line frequency; second pulse output means for producing an output at field frequency and connected to said means for deflecting to control scanning of the target means in the field direction at said field frequency; video output means for producing video output signals during successive scanning deflections of said cathode ray beam; and means connected to said second pulse generator means and said beam focusing means for modulating said beam focusing means to vary the beam focusing during successive field periods; the combination of:

reversible counter means for producing beam alignment output signals;

gate means connected to said first pulse output means for selectively passing the pulse output thereof to said counter means;

frequency divider means connected to said second pulse output means for reversing the direction of count of said counter means during said successive field periods;

further frequency divider means connected to the first frequency divider means for resetting said counter means to zero after each reversible count thereby during said successive field periods;

level detector means connected to the output of said video output means for producing an output having a first pulse during each field period upon occurrence of said boundary line extending in the line direction and a further pulse during each line period upon the occurrence of said boundary line extending in the field direction;

control means connected to the output of said second pulse output means and to the output of said level detector means for controlling said gate means to pass said output of the first pulse output means only during those portions of said successive field periods from the beginnings thereof until said first output pulse appears from said level detector means; and means for applying the output signal of said reversible counter means to said first beam alignment means after the counts thereby during said successive field periods.

3. In the combination as defined in claim 2 including:

pulse generator means for producing a pulse output to said counter means which is of frequency higher than said line frequency;

control means connected to the output of said level detector means and to the output of said first pulse output means for controlling said pulse generator means to produce outputs to said counter means only during those portions of successive second field periods other than the first successive field periods from the beginning of successive lines until said further pulses appear from said level detector means; and means for applying the output signal of said reversible counter means to said second beam alignment means after the counts thereby during said second field periods.

* * * * *